(12) United States Patent
Lai et al.

(10) Patent No.: US 10,645,329 B2
(45) Date of Patent: May 5, 2020

(54) KICKSTAND FOR COMPUTING DEVICES

(71) Applicant: HEWLETT-PACKARD DEVELOPMENT COMPANY, L.P., Houston, TX (US)

(72) Inventors: Lu-Yen Lai, Taipei (TW); Allen Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/067,692

(22) PCT Filed: Mar. 11, 2016

(86) PCT No.: PCT/US2016/021971
§ 371 (c)(1),
(2) Date: Jul. 2, 2018

(87) PCT Pub. No.: WO2017/155541
PCT Pub. Date: Sep. 14, 2017

(65) Prior Publication Data
US 2019/0132542 A1    May 2, 2019

(51) Int. Cl.
G06F 1/16       (2006.01)
H04N 5/44       (2011.01)
G06F 3/01       (2006.01)
G06K 9/00       (2006.01)
G06F 3/0488     (2013.01)

(52) U.S. Cl.
CPC ......... *H04N 5/4403* (2013.01); *G06F 1/1616* (2013.01); *G06F 1/1677* (2013.01); *G06F 1/1679* (2013.01); *G06F 1/1686* (2013.01); *G06F 3/013* (2013.01); *G06F 3/04883* (2013.01); *G06K 9/00248* (2013.01); *G06K 9/00288* (2013.01); *G06F 1/166* (2013.01); *H04N 2005/4428* (2013.01)

(58) Field of Classification Search
CPC ...... G06F 1/1616; G06F 1/1677; G06F 1/166; G06K 9/00221–00302
See application file for complete search history.

(56) References Cited

U.S. PATENT DOCUMENTS

| | | | |
|---|---|---|---|
| 6,266,241 | B1 | 7/2001 | VanBrocklin et al. |
| 6,290,411 | B1 | 9/2001 | Shirai |
| 6,944,012 | B2 | 9/2005 | Doczy et al. |

(Continued)

FOREIGN PATENT DOCUMENTS

| | | |
|---|---|---|
| CN | 104181975 | 12/2014 |
| CN | 104345790 | 2/2015 |

(Continued)

OTHER PUBLICATIONS

"Meet the New & Improved Roost Laptop Stand".

*Primary Examiner* — Robert J Hance
(74) *Attorney, Agent, or Firm* — HP Inc. Patent Department

(57) ABSTRACT

Examples disclosed herein provide a computing device with a kickstand. The computing device can determine an angle of a front surface of a display member of the computing with respect to a base member rotatably connected to the display member. Upon the angle exceeding a threshold value, the computing device can automatically eject the kickstand from a back surface of the display member.

9 Claims, 4 Drawing Sheets

(56) References Cited

U.S. PATENT DOCUMENTS

| | | | |
|---|---|---|---|
| 8,139,034 B2 | 3/2012 | Albouyeh et al. | |
| 8,593,798 B2 * | 11/2013 | Moon | G06F 1/1626 361/679.22 |
| 8,724,312 B2 | 5/2014 | Jones et al. | |
| 9,489,054 B1 * | 11/2016 | Sumsion | G06F 3/0208 |
| 10,191,511 B2 * | 1/2019 | Kang | G06F 1/1624 |
| 2002/0100398 A1 | 8/2002 | Santini | |
| 2005/0057894 A1 * | 3/2005 | Kim | G06F 1/1616 361/679.27 |
| 2008/0062624 A1 | 3/2008 | Regen et al. | |
| 2009/0147457 A1 * | 6/2009 | Chen | F16M 11/046 361/679.21 |
| 2009/0150006 A1 | 6/2009 | Albouyeh et al. | |
| 2009/0174658 A1 * | 7/2009 | Blatchley | G06F 1/1601 345/158 |
| 2009/0303205 A1 * | 12/2009 | Seibert | G06F 1/1616 345/204 |
| 2009/0321609 A1 * | 12/2009 | Wang | G06F 1/1626 248/685 |
| 2011/0316828 A1 * | 12/2011 | Shirbabadi | G06F 1/1603 345/207 |
| 2013/0229534 A1 * | 9/2013 | Panay | G06F 1/1618 348/207.1 |
| 2013/0321643 A1 * | 12/2013 | Fujinawa | H04N 7/183 348/169 |
| 2014/0151517 A1 | 6/2014 | Mapes | |
| 2014/0184489 A1 | 7/2014 | Ma et al. | |
| 2014/0202887 A1 | 7/2014 | Mongan et al. | |
| 2014/0226276 A1 * | 8/2014 | Sung | G06F 1/1681 361/679.27 |
| 2015/0257299 A1 * | 9/2015 | Su | A47B 97/00 361/679.01 |
| 2015/0293562 A1 * | 10/2015 | Nakamura | G06F 1/1616 361/679.27 |
| 2016/0147255 A1 * | 5/2016 | Scheruebel | G06F 1/1601 345/32 |
| 2016/0369543 A1 * | 12/2016 | Park | E05D 11/1007 |
| 2017/0027069 A1 * | 1/2017 | Yu | F16M 13/005 |
| 2017/0155831 A1 * | 6/2017 | Jang | H04N 7/147 |
| 2017/0262053 A1 * | 9/2017 | Noh | G06F 3/013 |

FOREIGN PATENT DOCUMENTS

| | | | | |
|---|---|---|---|---|
| EP | 2891941 | | 7/2015 | |
| JP | 3169755 U | * | 7/2011 | G09F 9/00 |
| JP | 3169755 | * | 8/2011 | G09F 9/00 |
| KR | 10-20150077667 | | 7/2015 | |

* cited by examiner

KICKSTAND FOR COMPUTING DEVICES

BACKGROUND

The emergence and popularity of mobile computing has made computing devices, due to their compact design and light weight, a staple in today's marketplace. Within the mobile computing realm, notebook computers, or laptops, are one of the most widely used devices and generally employ a clamshell-type design consisting of two members connected together at a common end via hinges, for example. In most cases, a first or display member is utilized to provide a viewable display surface to a user while a second or base member includes an area for user input (e.g., touchpad and keyboard). In addition, the viewable display surface may be a touchscreen, allowing the user to interact directly with what is displayed by touching the display surface with simple or multi-touch gestures.

DETAILED DESCRIPTION

Figure 1:
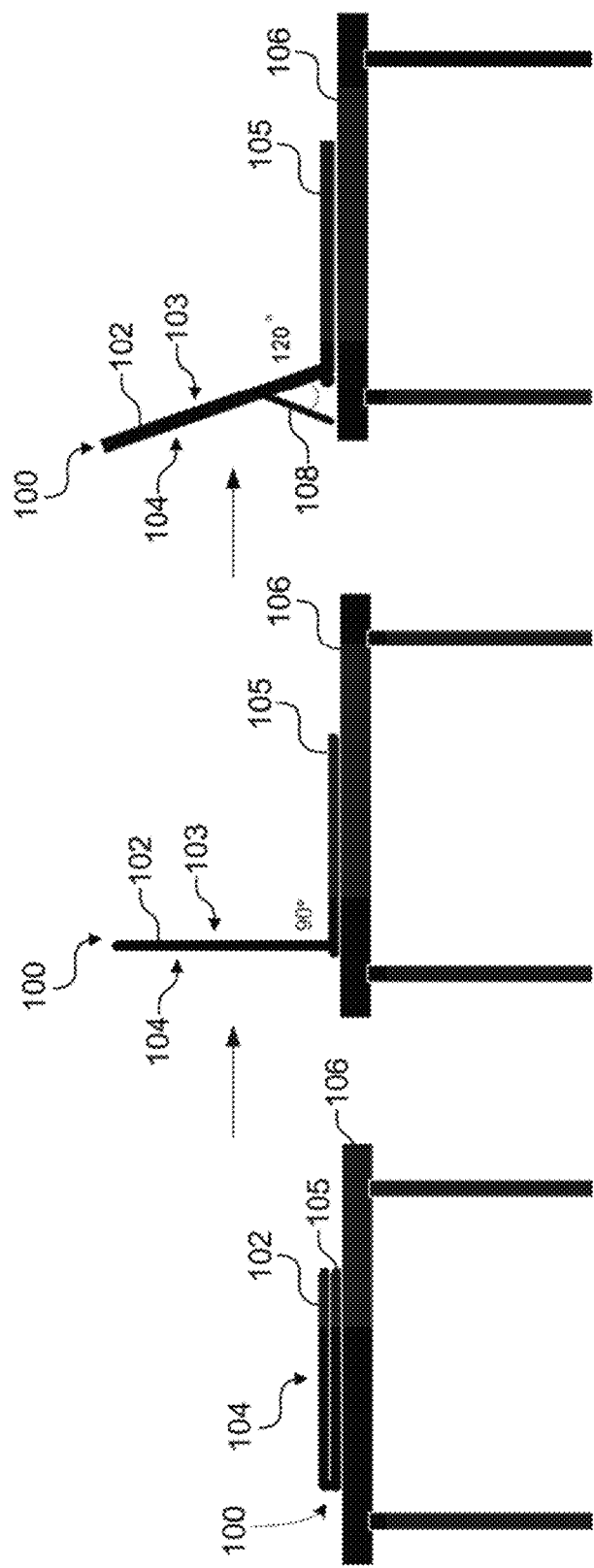
FIG. 1 illustrates different views of a computing device on a surface, according to an example.

Notebook computers may include a feature that allows the device to be "converted" from one style of use to another style of use. For example, a notebook computer may be converted from a laptop mode, where the touchpad and keyboard of the base member is available to be used as input, to a tablet mode, where the display surface of the display member may be used for both viewing and input. Such devices that serve this dual purpose may be called convertible laptops.

Many form factors exist for convertible laptops. A common form factor includes a display member that is detachable from a base member to operate the display member in tablet mode. With the ability to operate the display member independently from the base member in tablet mode, a majority, if not all, of the internal components, such as electrical components, of the laptop may be assembled within the display member. Examples of the internal components include, but are not limited to, the battery, hard drive, memory, and processor. As an example, the base member may only contain circuitry for the touchpad and the keyboard, and circuitry for any ports to which cables/connections can be connected. As a result, the detachable display member of a convertible laptop may weigh more than its base member. As an example, such computing devices may include a kickstand rotatably connected to the display member that supports the display member at multiple viewing angles when such computing devices are operated in one of its various modes, such as laptop mode or tablet mode. As a result, the kickstand may avoid a computing device from toppling backwards, for example, when the computing device is operated in laptop mode.

Examples disclosed herein provide the ability for the kickstand to automatically eject and support the display member of the computing device when certain conditions are met. For example, if the angle between the display surface of the display member and the base member is greater than 90 degrees, and the base member is disposed in a horizontal position, the computing device may automatically eject the kickstand to support the display member. As will be further described, the computing device may also automatically adjust the kickstand to change the angle of the display surface of the display member with respect to the base member, in order to continuously provide an optimal viewing angle of the display surface to a user, for example, when the user sits down or stands up in front of the computing device. By automating operations of the kickstand without requiring manual input from the user, such as manually ejecting or adjusting the kickstand, user experience of the computing device may be improved.

As used herein, a "kickstand" refers to a support member connected to a computing device for propping up the device in a plurality of viewing angles. As an example, the kickstand may be a rectangular frame that flips out or pivots from a portion of a perimeter of the device and makes contact with a surface in various positions for propping up the device at the various viewing angles. As a result, the computing device may be kept upright via the kickstand without leaning the device against another object or with the aid of a user.

With reference to the figures, FIG. 1 illustrates different views of a computing device 100 on a surface 106, according to an example. The surface 106 may be a horizontal or level surface, such as, for example, a desk or table. The computing device 100 may include a display member 102 that includes a front surface 103, such as a display surface or screen, and a back surface 104 opposite the front surface 103. The display surface 103 may be a touchscreen, allowing a user to interact directly with what is displayed by touching the screen with simple or multi-touch gestures. As an example, the display member 102 is attachable and rotatably connected to a base member 105. The base member 105 may include an area for user input, such as a touchpad and keyboard.

As an example, the display member 102 may be operated independently from the base member 105, for example, in a tablet mode. As a result, a majority, if not all, of the internal components, such as electrical components, of the computing device 100 may be assembled within the display member 102. As a result, the display member 102 of the computing device 100 may weigh more than the base member 105. As an example, the computing device 100 may include a kickstand 108 rotatably connected to the display member 102, that may support the display member 102 at multiple viewing angles when the computing device 100 is operated in one of its various modes, such as laptop mode. As a result, the kickstand 108 may avoid the display member 102 of the computing device 100 from toppling backwards. Although the display member 102 may weigh more than the base member 105, the kickstand 108 may ensure a positive user experience. As will be further described, the computing device 100 may automatically eject the kickstand 108 from the back surface 104 of the display member 102 when certain conditions are met, and may also automatically adjust the kickstand 108 to continue to support the display member 102 when the viewing angle of the computing device 100 changes.

In the first view of FIG. 1, the computing device 100 is in a closed, folded position, where the front surface 103 of the display member covers a top surface of the base member 105, as an example. In the second view of FIG. 1, the display member 102 of the computing device 100 is opened by 90 degrees. In the third view of FIG. 1, the display member 102 of the computing device 100 is opened further, to 120 degrees. As an example, when the display member 102 is opened more than 90 degrees, the computing device 100 may automatically eject the kickstand 108 in order to support the display member 102, as described above. As an example, the threshold value for determining at which angle the kickstand should eject may be adjustable. In addition to the kickstand 108 automatically ejecting when the display member 102 is opened over 90 degrees, the computing device 100 may only eject the kickstand 108 when the base member 105 is disposed in a horizontal position, or close to a horizontal position (e.g., +/−5 degrees), such as when the computing device 100 is being used on the surface 106 or a user's lap. As a result, the computing device 100 may prevent the kickstand 108 from ejecting, when its use is not needed or desirable (e.g., if the base member 105 is in a vertical position)

As an example, in order to determine the angle of the front surface 103 of the display member 102 with respect to the base member 105, or determine the position of the base member 105, the computing device 100 includes motion sensors, such as accelerometers, that may be used to determine the angle. As an example, a first motion sensor disposed in the display member 102 may measure the orientation of the display member 102, and a second motion sensor disposed in the base member 105 may measure the orientation of the base member 105. Upon comparing these orientations, the angle of the front surface 103 of the display member 102 with respect to the base member 105 may be determined. As mentioned above, this angle may be used to determine whether the kickstand 108 should be automatically ejected in order to support the display member 102 while the computing device is in use.

As an example, the first and second motion sensors for detecting the orientations of the display member 102 and base member 105, respectively, may include accelerometers for detecting orientations with respect to a reference plane (e.g., the horizontal surface 106 or gravity). As an example, both accelerometers may be calibrated, for example, in a flat keyboard position on the horizontal surface 106, with the computing device 100 in the closed, folded position illustrated in the first view of FIG. 1. The angle delta between the display member 102 and base member 105 may be 0 degrees in the orientation illustrated in the first view of FIG. 1. After calibration, the accelerometers (e.g., first and second motion sensors) may measure the orientations of the display member 102 and base member 105 with respect to a reference plane, such as the top surface of the base member 105. These orientations may be compared against each other in order to determine the angle of the front surface 103 of the display member 102 with respect to the base member 105. Examples of other motion sensors that may be used include, but are not limited to, a compass and a gyroscope, that may be used alone or in combination.

As mentioned above, in addition to the computing device 100 automatically ejecting the kickstand 108 when the display member 102 is opened over 90 degrees, the kickstand 108 may only eject when the base member 105 is disposed in a horizontal position, or close to a horizontal position (e.g., +/−5 degrees). The motion sensor (e.g., accelerometer) disposed in the base member 105 may be used for determining whether the base member 105 is disposed in such a horizontal position.

As an example, upon ejecting from the back surface 104 of the display member 102, the computing device 100 may also automatically adjust the kickstand 108 to change the angle of the front surface 103 of the display member 102 with respect to the base member 105, in order to continuously provide an optimal viewing angle of the front surface 103 to a user, for example, when the user sits down or stands up in front of the computing device 100. As will be further described, the computing device 100 may also perform facial recognition to detect a user, and restore the position of the kickstand 108 to a last position used by the detected user.

Figure 2B:
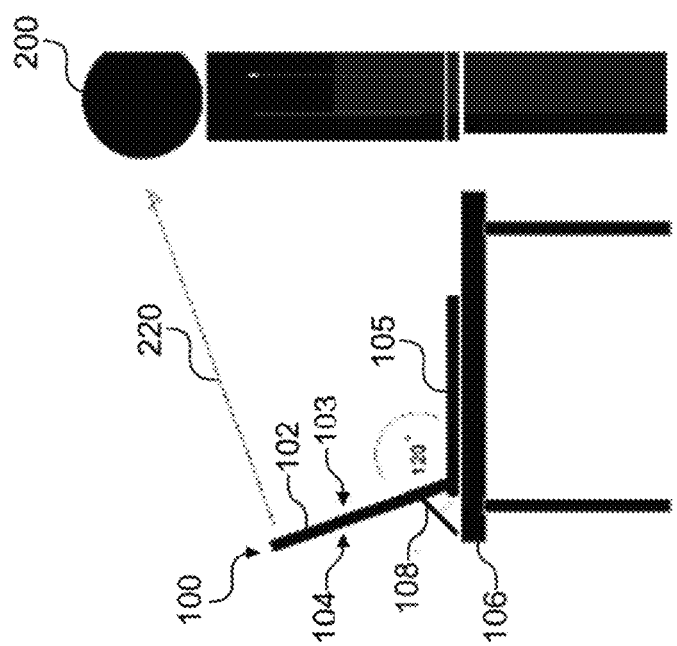
FIGS. 2A-B illustrate a kickstand automatically adjustable to provide an optimal viewing angle of a front surface of a display member of the computing device, according to an example.
Figure 2A:
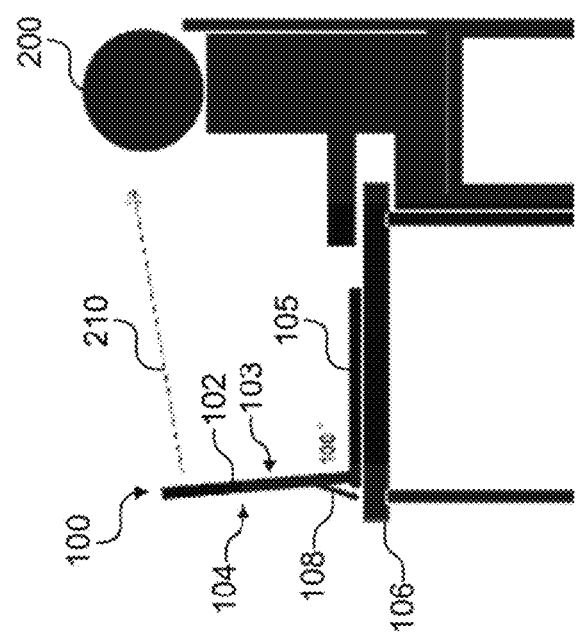

FIGS. 2A-B illustrate the kickstand 108 automatically adjustable to provide an optimal viewing angle of the front surface 103 of the display member 102 to a user 200, according to an example. As an example, the computing device 100 includes an image sensor, such as included in a camera or webcam, to detect positioning of the eyes of the user 200 with respect to the front surface 103 of the display member 102. Upon detecting the positioning of the eyes of the user 200, the computing device 100 may automatically adjust the kickstand 108 when a change in the positioning of the eyes is detected (e.g., if the user 200 sits down or stands up). Adjustments made to the kickstand 108 changes the angle of the front surface 103 of the display member 102 with respect to the base member 105, to provide an optimal viewing angle of the front surface 103 to the user 200, based on the detected eyes of the user 200.

Referring to FIG. 2A, the image sensor of the computing device 100 may detect the positioning of the eyes of the user 200 (indicated by arrow 210), and the computing device 100 may adjust the kickstand 108 so that the angle of the front surface 103 of the display member 102 with respect to the base member 105 is 100 degrees. Referring to FIG. 2B, as the user 200 stands up, the image sensor of the computing device 100 may detect a change in the positioning of the eyes of the user 200 (indicated by arrow 220). The change in the positioning of the eyes of the user 200 may cause the computing device 100 to adjust the kickstand 108 further so that the angle of the front surface 103 of the display member 102 with respect to the base member 105 is now 120 degrees. Similarly, if the user 200 sits down again, the kickstand 108 may automatically readjust so that the viewing angle of the front surface 103 of the display member 102 is optimal for the user (e.g., back to 100 degrees).

Various users may use the same computing device 100. As an example, each user may have a personal preference on the viewing angle of the computing device 100. In order to improve user experience, the computing device 100 may incorporate facial recognition technology in order to identify a user currently using the computing device (e.g., via the image sensor), and restoring the position of the kickstand 108 to a last position used by the user. If the user changes the viewing angle of the computing device, any changes to the position of the kickstand 108 may be saved, in order to restore the kickstand 108 to the changed position the next time the user is to use the computing device 100.

Figure 3:
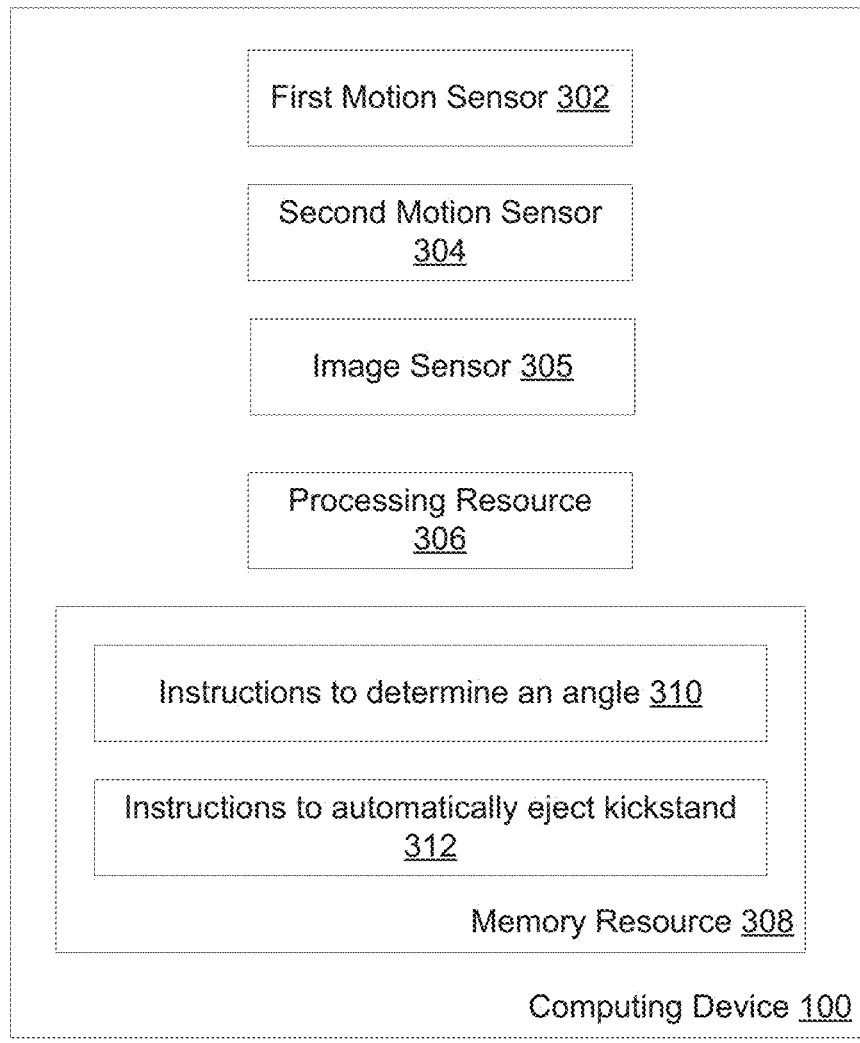
FIG. 3 is a block diagram illustrating the computing device, according to an example.

FIG. 3 is a block diagram illustrating the computing device 100, according to an example. The computing device 100 also includes a controller or processing resource 306 and a memory resource 308. The components of the computing device 100 may be connected and communicate through a system bus (e.g., PCI, ISA, PCI-Express, Hyper-Transport®, NuBus, etc.). The processing resource 306 can be a single core processor, a multi-core processor, a computing cluster, or any number of other configurations. The processing resource 306 may be implemented as Complex Instruction Set Computer (CISC) or Reduced Instruction Set Computer (RISC) processors, x86 Instruction set compatible processors, multi-core, or any other microprocessor or central processing unit (CPU).

The memory resource 308 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems comprising (e.g., encoded with) instructions 310 and 312. In some examples, the memory resource 308 may include additional instructions. As an example, memory resource 308 may be a non-transitory machine-readable storage medium. The processing resource 306 may fetch, decode, and execute instructions stored on the memory resource 308 to implement the functionalities described below. As an example, the operations or instructions may be executed at least by first and second motion sensors 302, 304, and image sensor 305. As described above, the first motion sensor 302 may be disposed in the display member 102 and measure the orientation of the display member 102. Similarly, the second motion sensor 304 may be disposed in the base member 105 and measure the orientation of the base member 105. Referring back to FIGS. 2A-B, the image sensor 305 may detect positioning of the eyes of the user 200 with respect to the front surface 103 of the display member 102.

As an example, the motion sensors 302, 304 may operate in polling mode or interrupt mode. In polling mode, the processing resource 306 may poll the motion sensors 302, 304, for example, at fixed time intervals, in order to obtain measurements. However, if there are power management benefits, the motion sensors 302, 304 may rather be operated in interrupt mode, where either sensor 302, 304 may trigger the processing resource 306 to read a measurement, for example, when either sensor 302, 304 reads a change in measurement above a threshold amount. As a result, the processing resource 306 may remain in sleep mode until a measurement above the threshold amount is read by either motion sensor 302, 304, thereby providing power management benefits.

Figure 4:
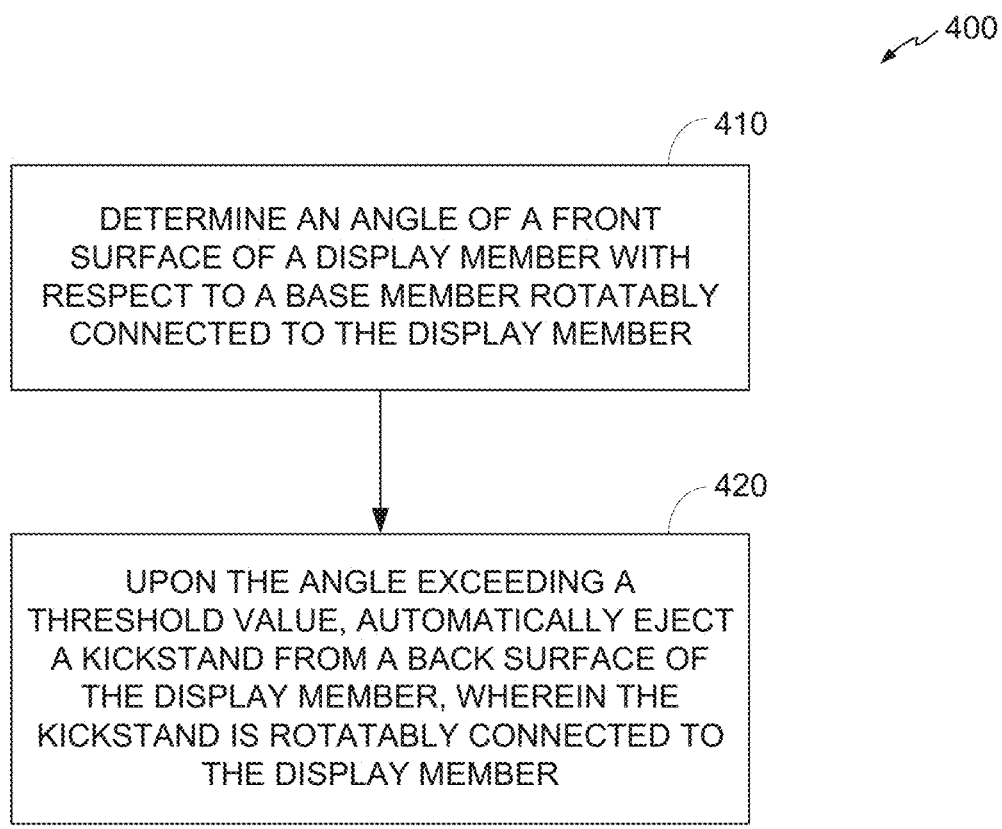
FIG. 4 is a flow diagram in accordance with an example of the present disclosure.

Referring to FIG. 4, a flow diagram is illustrated in accordance with various examples. The flow diagram illustrates, in a particular order, processes for determining whether a kickstand should be automatically ejected for supporting a display member of a computing device. The order of the processes is not meant to limit the disclosure. Rather, it is expressly intended that one or more of the processes may occur in other orders or simultaneously. The disclosure is not to be limited to a particular example.

A method 400 may begin and progress to 410, where the computing device may determine an angle of a front surface of the display member with respect to a base member that may be attachable and rotatably connected to the display member.

Progressing to 420, the computing device may determine whether to automatically eject the kickstand from the back surface of the display member. For example, factors that may be taken into consider is if the angle exceeds a threshold value and if the base member is disposed in a horizontal position.

Upon automatically ejecting the kickstand from the back surface of the display member, the computing device may detect positioning of eyes of a user of the computing device, with respect to the front surface of the display member. If there is a change in the positioning of the eyes of the user, the computing device may automatically adjust a position of the kickstand, to change the angle of the front surface of the display member with respect to the base member in order to follow the positioning of the eyes of the user.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method for a computing device comprising a display member rotatably connected to a base member, the method comprising:
   rotating the display member to a position where an angle of a front surface of the display member with respect to the base member exceeds a threshold value;
   detecting the angle of the front surface of the display member with respect to the base member;
   automatically ejecting a kickstand that is rotatably connected to the display member from a back surface of the display member to change the angle of the front surface of the display member with respect to the base member;
   upon automatically ejecting the kickstand:
   identifying a user of the computing device via facial recognition; and
   restoring the position of the kickstand to a last position used by the user.

2. The method of claim 1, wherein upon the angle exceeding the threshold value, the kickstand is to automatically eject from the back surface of the display member when the base member is to be disposed in a horizontal position.

3. The method of claim 1, comprising saving any change in the position of the kickstand to restore the kickstand to the changed position the next time the user is to use the computing device.

4. The method of claim 1, comprising, upon automatically ejecting the kickstand from the back surface of the display member, detecting positioning of eyes of the user, with respect to the front surface of the display member.

5. The method of claim 4, comprising automatically adjusting a position of the kickstand to change the angle of the front surface of the display member with respect to the base member in order to follow the positioning of the eyes of the user.

6. A computing device comprising:
   a display member including a display surface and a back surface opposite the display surface;

a base member to which the display member is rotatably connected;

a kickstand rotatably connected to the display member;

a memory resource; and a processing resource, wherein a plurality of programming instructions stored in the memory resource, in response to execution of the programming instructions by the processing resource, is to cause the processing resource to:

determine an angle of the display surface of the display member with respect to the base member;

detect positioning of eyes of a user of the computing device with respect to the display surface of the display member; and automatically eject the kickstand, in response to the angle exceeding a threshold value, from the back surface of the display member when the base member is to be disposed in a horizontal position to change the angle of the display surface of the display member with respect to the base member to follow the positioning of the eyes of the user.

7. The computing device of claim 6, comprising an image sensor, wherein the processing resource is to use the image sensor to detect positioning of the eyes of the user of the computing device, with respect to the display surface of the display member.

8. The computing device of claim 7, wherein the processing resource is to:

use the image sensor to identify the user via facial recognition; and restore the position of the kickstand to a last position used by the user.

9. The computing device of claim 8, wherein the processing resource is to save any change in the position of the kickstand to restore the kickstand to the changed position the next time the user is to use the computing device.

* * * * *